United States Patent [19]

Kelbel

[11] 4,193,316

[45] Mar. 18, 1980

[54] TRANSMISSION SHIFT CONTROL MECHANISM

[75] Inventor: Donald W. Kelbel, Muncie, Ind.

[73] Assignee: Borg-Warner Corporation, Chicago, Ill.

[21] Appl. No.: 867,073

[22] Filed: Jan. 5, 1978

[51] Int. Cl.$^2$ .......................... G05G 9/18; G05G 5/10
[52] U.S. Cl. ..................................... 74/477; 74/473 R
[58] Field of Search ..................... 74/473 R, 475, 476, 74/477

[56] References Cited

U.S. PATENT DOCUMENTS

| | | | |
|---|---|---|---|
| 2,547,317 | 4/1951 | Gustafson | 74/473 R |
| 2,694,943 | 11/1954 | Brumbaugh | 74/473 R |
| 3,550,467 | 12/1970 | Forichon | 74/473 R |
| 3,645,145 | 2/1972 | Galas | 74/473 R |
| 3,929,029 | 12/1975 | Kelbel | 74/477 |

OTHER PUBLICATIONS

1977 Honda Service Manual, #6165730, pp. 31.5, 31.19, 31.20, and 31.25.

Primary Examiner—Allan D. Herrmann
Attorney, Agent, or Firm—Julian Schachner

[57] ABSTRACT

A shift control mechanism particularly adapted for use with a manual transmission having a main control shaft on an axis normal to a single shift fork rail. Both rotational and longitudinal motion is transferred from the main control shaft to the shift fork rail through a single pivoted idler lever. A pair of shift forks and a reverse gear transfer bar are connected to an interlock system which insures that the shift fork rail establishes only one gear ratio at any time as it is rotated for crossover selection and moved longitudinally for gear engagement.

32 Claims, 9 Drawing Figures fig.1.

TRANSMISSION SHIFT CONTROL MECHANISM

BACKGROUND OF THE INVENTION

This invention relates generally to the control of an automotive transmission or the like. More particularly, it relates to an improved shift control mechanism for a manual transmission, the transmission being particularly adaptable for use in a front-wheel-drive automotive vehicle having a transversely mounted engine.

In recent years there have been many improvements in automotive drive trains, including improvements relating to the shifting of sliding gear manual transmissions. One such transmission is disclosed in U.S. Pat. No. 3,929,029 issued Dec. 30, 1975. As disclosed therein first and second shift rails are connected by a link element. A shift stick is connected to the first shift rail such that movement in one direction causes rotation and movement in another direction causes longitudinal sliding of this shift rail. Motion of the first shift rail is transmitted to the other shift rail by the link element so as to provide opposite rotational and longitudinal sliding thereof.

One disadvantage of this arrangement is the requirement for two parallel shift rails. This results in a complex linkage arrangement, as well as a bulky apparatus which in turn requires a large extension housing for the transmission. Another disadvantage is that orientation of the shift rails is such that it would be difficult to incorporate this control mechanism in a front-wheel-drive vehicle having a transversely mounted transmission.

SUMMARY OF THE INVENTION

One of the objects of this invention is to overcome the disadvantages noted above. To that end, there is provided a shift control mechanism which may be incorporated in a multi-speed manual transmission having, for example, four fully synchronized forward gear ratios and a reverse gear ratio. Such a transmission is adapted for crosswise installation in a front-wheel-drive automotive vehicle.

A control input shaft enters the side of the transmission and is oriented transversely to a single shift fork rail. A single idler lever is mounted on a fulcrum shaft which is transverse to both the control input shaft and the shift fork rail. Rotary motion is imparted to the control input shaft for crossover selection of gear ranges. This motion is transferred to the idler lever, causing it to slide on its fulcrum shaft. This in turn imparts rotary motion to the shift fork rail and to an associated shift fork selector head. The head enters one of the associated shift forks or a reverse transfer bar. A suitable interlock insures that only one selection is obtainable at any time.

Once proper crossover selection has been completed, the control input shaft is moved longitudinally to engage the appropriate gear. Longitudinal motion causes the idler lever to rotate about its fulcrum shaft. This motion is imparted to the shift fork rail, which is moved longitudinally to complete the shift into the desired gear range.

Engagement in a forward gear ratio is accomplished by selection and movement of an appropriate shift fork. Engagement in reverse is accomplished by selection of the reverse transfer bar and, upon movement thereof, movement of an associated reverse idler lever to engage a reverse idler gear.

The shift control mechanism disclosed herein requires only one idler lever and one shift fork rail. Thus, the mechanism requires fewer parts of a less complicated nature than mechanisms known heretofore. Some of the close dimensional tolerances inherent in prior art mechanisms are eliminated, and the overall cost thus is reduced.

BRIEF DESCRIPTION OF THE DRAWINGS

The objects and advantages of this invention will become apparent to those skilled in the art upon careful consideration of the specification herein, including the drawings wherein.

While this invention is susceptible of embodiment in many different forms, there is shown in the drawings and herein will be described in detail a preferred embodiment. It should be understood that the present disclosure is considered to be an exemplification of the principles of the invention and is not intended to limit the invention to this embodiment.

DESCRIPTION OF A PREFERRED EMBODIMENT

Referring now to the drawings in greater detail, there is shown generally a compact manual transmission 10 adapted for use in an automotive vehicle incorporating a transversely mounted engine. Transmission 10 is particularly adapted for transverse mounting so as to transmit torque from the engine through the drive axle assembly to the front wheels. Transmission 10 includes a housing 12 which may be an associated clutch housing, and which may include or be adjacent to an associated differential.

An input shaft 14 is journalled in housing 12 and is adapted to receive torque from the engine through an appropriate clutch. Similarly, a countershaft or output shaft 16 is journalled in housing 12 and is oriented adjacent the ring gear 18 of an associated differential.

Defined by or secured to input shaft 14 are a first ratio input gear 20, a reverse ratio input gear 22, a second ratio input gear 24, a third ratio input gear 26 and a fourth ratio input gear 28. Journalled on output shaft 16 are a first ratio output gear 30, a second ratio output gear 32, a third ratio output gear 34, and a fourth ratio output gear 36. Gear 20 is in mesh with gear 30, gear 24 is in mesh with gear 32, gear 26 is in mesh with gear 34, and gear 28 is in mesh with gear 36. An output drive gear 38 is defined by or secured to output shaft 16 and is in mesh with gear 18.

Figure 5:
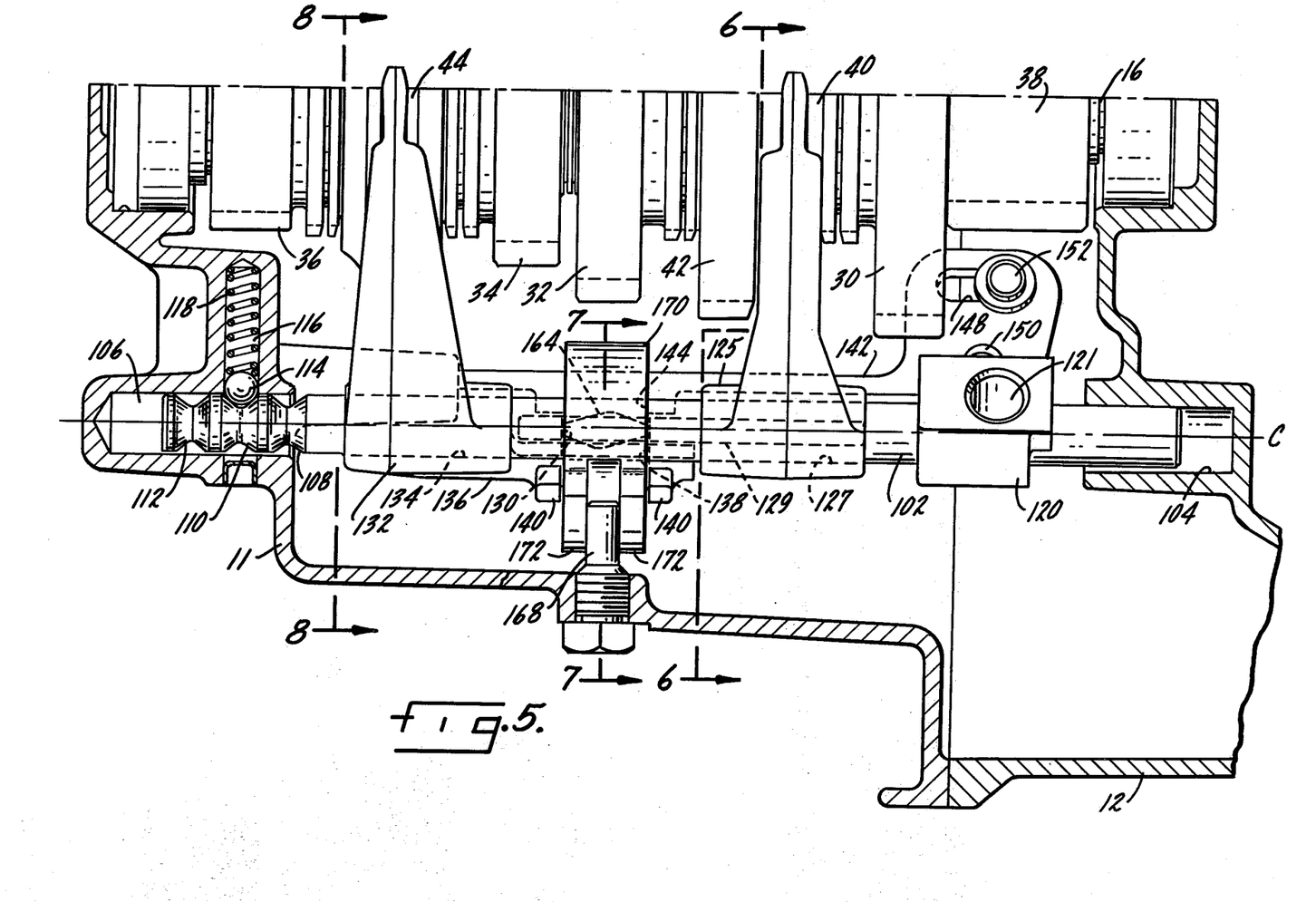
FIG. 5 is a sectional view taken along the line 5—5 of FIG. 1 showing additional details of the shift control mechanism, namely the shift fork rail, as well as the shift forks synchronizers, reverse transfer bar and output gears.

A suitable first-second synchronizing clutch mechanism 40 is slidably supported by output shaft 16. A reverse ratio output gear 42 is secured to the hub of synchronizer 40. A similar third-fourth synchronizing clutch mechanism 44 is slidably supported by output shaft 16. As shown in FIG. 5, synchronizer 40 may slide rightwardly to engage gear 30 with output shaft 16, thereby establishing the first forward gear ratio. Synchronizer 40 may slide leftwardly to engage gear 32 with output shaft 16, thereby establishing the second forward gear ratio. Similarly, synchronizer 44 may slide to the right to engage gear 34 with output shaft 16, thereby establishing the third forward gear ratio, and to the left to engage gear 36 with output shaft 16, thereby establishing the fourth forward gear ratio.

A reverse support block 46 is rigidly secured within a housing 11 by suitable bolts 48 or the like. As bolts 48 do not extend through the exterior wall of housing 11, transmission assembly is facilitated without introducing a potential leakage point in this area. A reverse idler shaft 50 is entered into block 46 and into a suitable bore 52 defined by housing 12. A reverse idler gear 54 is rotatably supported on shaft 50 and is slidable relative thereto. Gear 54 defines a groove 56. Gear 54 is slidable from the disengaged position shown in FIG. 4 to the right into meshing engagement with gears 22 and 42, thereby establishing the reverse gear ratio.

Turning now to the mechanism for shifting synchronizers 40 and 44 and gear 54, there is shown a control input shaft 58 received in bores 60 and 62, respectively defined by housing 12 and a boss 64 formed by housing 12. Control shaft 58 is rotatable on a first axis A, and is axially or longitudinally slidable thereon. Control shaft 58 defines spaced notches 66, 68 and 70. A detent plunger 72 is slidably received in a bore 74 defined by boss 64. A suitable spring 76 biases detent 72 toward control shaft 58. With detent 72 engaged in one of notches 66, 68 or 70, control shaft 58 is restrained in one of its longitudinal positions. A control head 78 is secured to control shaft 58 for rotational and longitudinal movement therewith. Control head 78 defines a socket 80.

A fulcrum pin 82 is pressed into bores 84 and 86, respectively defined by housing 12 and a boss 88 formed by housing 12. Fulcrum pin 82 is thus rigidly secured to housing 12 on a second axis B substantially normal to first axis A.

An idler lever 90 is supported on fulcrum pin 82 by suitable bearings 92 or the like for pivotal movement about axis B and sliding movement axially or longitudinally therealong. Idler lever 90 defines a first lever arm 94, from which extends a first ball 96. Ball 96 is received in socket 80 of control head 78 to form therewith a first articulated connection. Idler lever 90 also defines a second lever arm 98. A second ball 100 is secured to lever arm 98 and extends therefrom.

A shift fork rail 102 is received in bores 104 and 106 defined by housings 12 and 11 for rotation on a third axis C and for sliding movement axially or longitudinally therealong. Axis C is substantially normal to both axes A and B, and is substantially parallel to output shaft 16. Shift rail 102 defines spaced notches 108, 110 and 112. A detent ball 114 is slidably received in a bore 116 defined by housing 11. A suitable spring 118 biases detent 114 toward shift rail 102. With detent 114 engaged in one of notches 108, 110 or 112, shift rail 102 is restrained in one of its longitudinal positions. A shift head 120 is secured to shift rail 102 for rotational and longitudinal movement therewith. Shift head 120 defines a socket 121 in which is received ball 100 of idler lever 90 to form therewith a second articulated connection.

Figure 1:
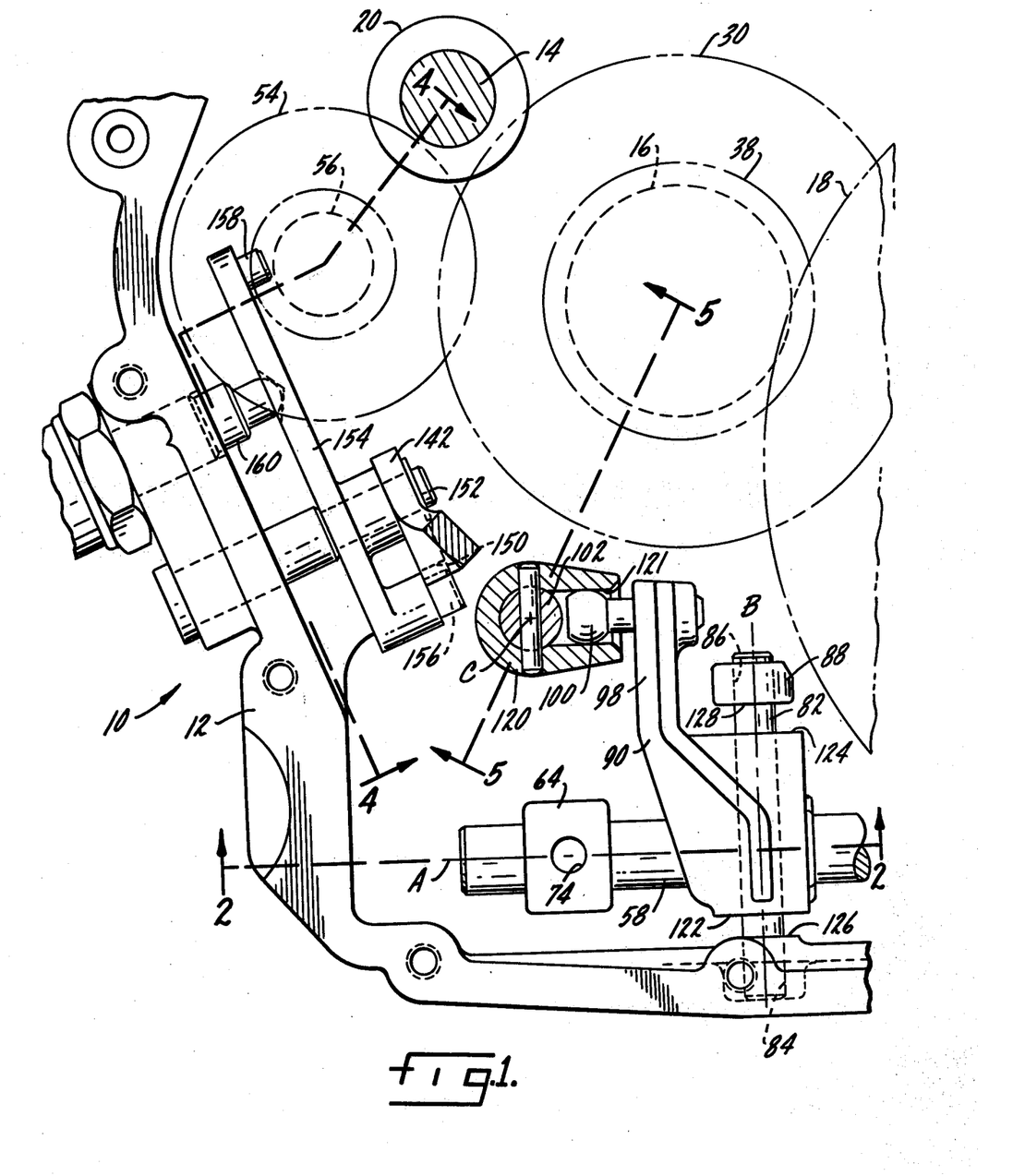
FIG. 1 is a transverse sectional view showing the orientation of the various transmission shafts and gears and showing details of the shift control mechanism.
Figures 3, 7, 8, 9:
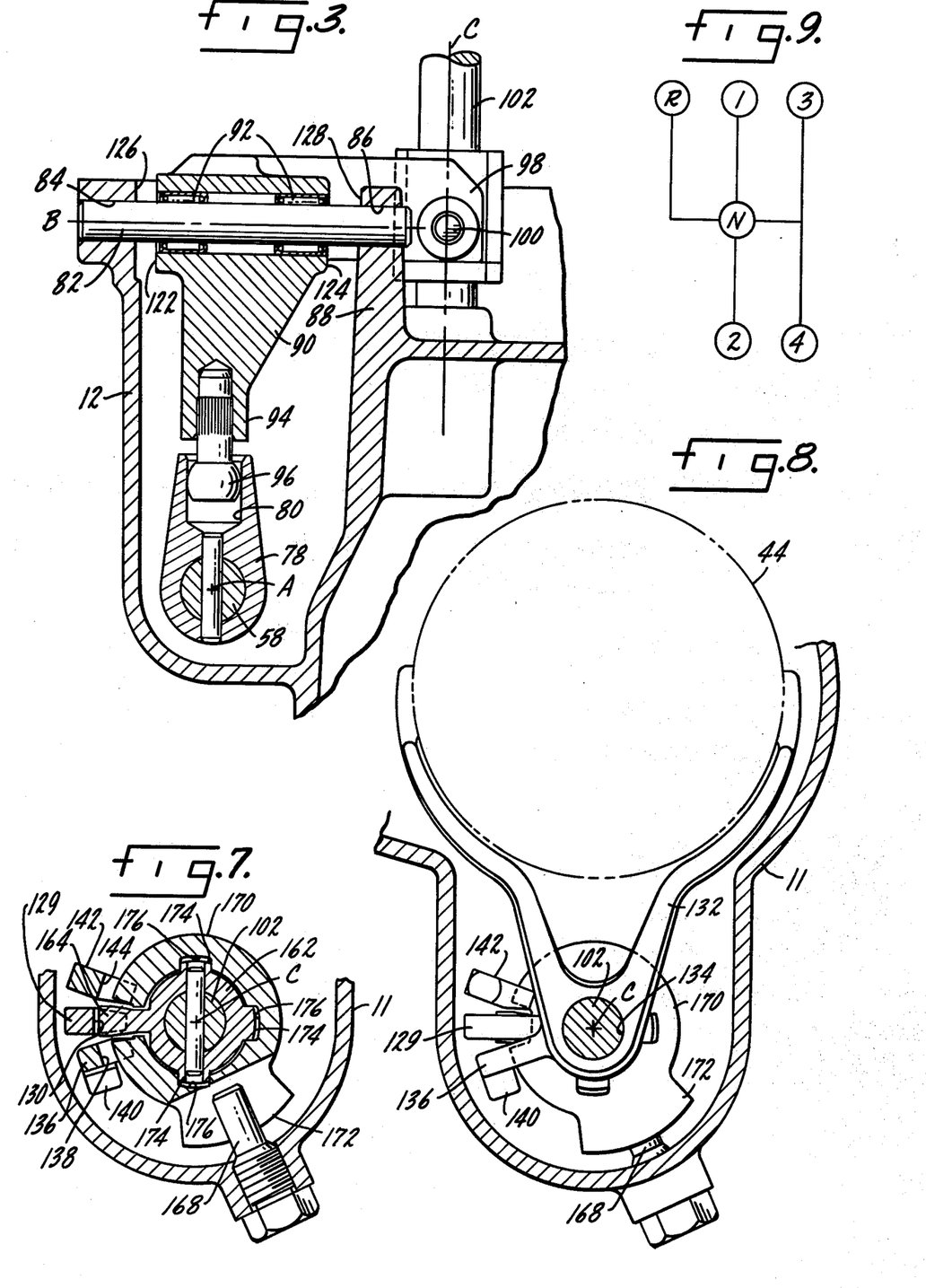
FIG. 3 is a sectional view taken along the line 3—3 of FIG. 2 showing additional details of the shift control mechanism.
FIG. 7 is a sectional view taken along the lines 7—7 of FIG. 5 showing details of the interlock and its relationship to the reverse transfer bar and the two shift forks.
FIG. 8 is a sectional view taken along the line 8—8 of FIG. 5 showing additional details of the shift fork for establishing the third and fourth gear ratios, as well as its orientation relative to the reverse transfer bar and the other shift fork.
FIG. 9 is a diagram showing the shift pattern for establishing the various gear ratios.

As best shown in FIGS. 1 and 3, rotation of control shaft 58 and control head 78 on axis A causes idler lever 90 to slide longitudinally along axis B. This in turn causes rotation of shift head 120 and shift rail 102 on axis C. The distance from axis A to first connection 96-80 relative to the distance from second connection 100-121 to axis C determines a mechanical advantage obtained as shift rail 102 is rotated.

Figures 2, 6:
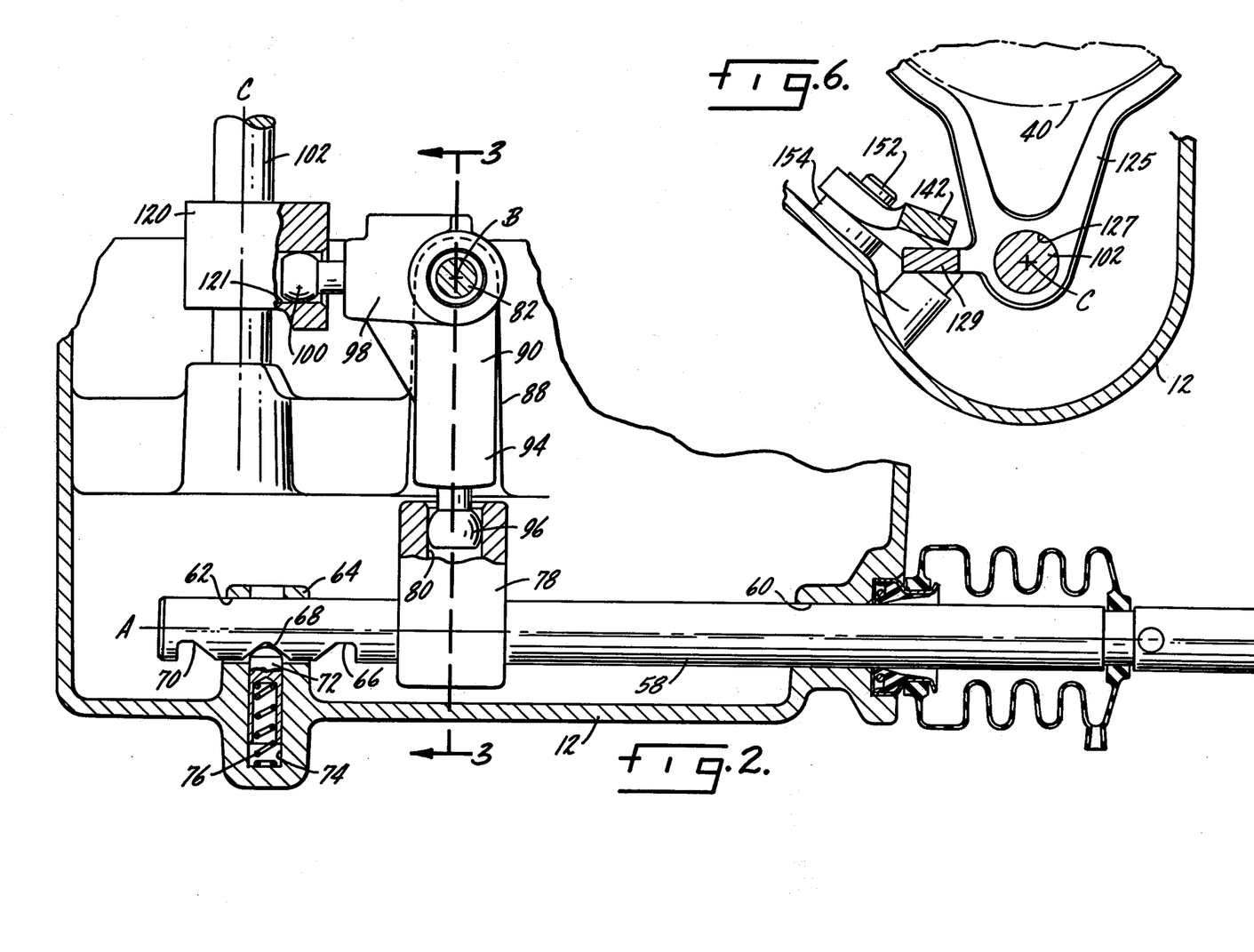
FIG. 2 is a partial sectional view taken along the line 2—2 of FIG. 1 showing additional details of the shift control mechanism.
FIG. 6 is a partial sectional view taken along the line 6—6 of FIG. 5 showing additional details of the reverse transfer bar and the shift fork for establishing the first and second forward gear ratios.

As best shown in FIG. 2, axial or longitudinal movement of control shaft 58 and control head 78 along axis A causes pivotal movement of idler lever 90 about axis B. This in turn causes axial or longitudinal movement of shift head 120 and shift rail 102 along axis C. The distance from first connection 96-80 to axis B relative to the distance from axis B to second connection 100-121 determines a mechanical advantage obtained as shift rail 102 is moved longitudinally.

As best shown in FIG. 1, idler lever 90 defines surfaces 122 and 124 respectively cooperable with surface 126 defined by housing 12 and surface 128 defined by boss 88. Abutment of surface 122 against surface 126 serves to limit clockwise rotation of shift rail 102. Similarly, abutment of surface 124 against surface 128 serves to limit counterclockwise rotation of shift rail 102.

In a preferred form of the invention, rotation of control shaft 58 by 12 degrees in one direction abutts surface 122 against surface 126. This results in rotation of shift rail 102 by 20 degrees in one direction. Rotation of control shaft 58 by 12 degrees in the opposite direction is not sufficient to abut surface 124 against surface 128. This allows rotation of shift rail 102 slightly more than 20 degrees in the opposite direction, for a purpose to be explained. Alternatively, surfaces 124 and 128 could be arranged such that a 12 degree rotation of control shaft 58 would cause them to abutt, thereby limiting rotation of shift rail 102 to 20 degrees in either direction, for a purpose to be explained.

A first shift fork 125 is engaged with synchronizer 40 to effect shifting thereof. Shift fork 125 defines a bore 127 in which shift rail 102 is slidably received. As best shown in FIGS. 5 and 7, shift fork 125 also defines a bar 129 extending along shift rail 102 and defining an inwardly facing slot 130. Similarly, a shift fork 132 is engaged with synchronizer 44 for effecting shifting thereof. Shift fork 132 defines a bore 134 in which shift rail 102 is slidably received. Shift fork 132 also defines a bar 136 extending along shift rail 102 and defining an inwardly facing slot 138 in alignment with slot 130. In a preferred form of the invention, bar 136 is spaced from bar 129 by 20 degrees. A pad 140 is secured to bar 136 on the far side thereof from bar 129. Pad 140 serves as a limit stop partially closing slot 138.

Figure 4:
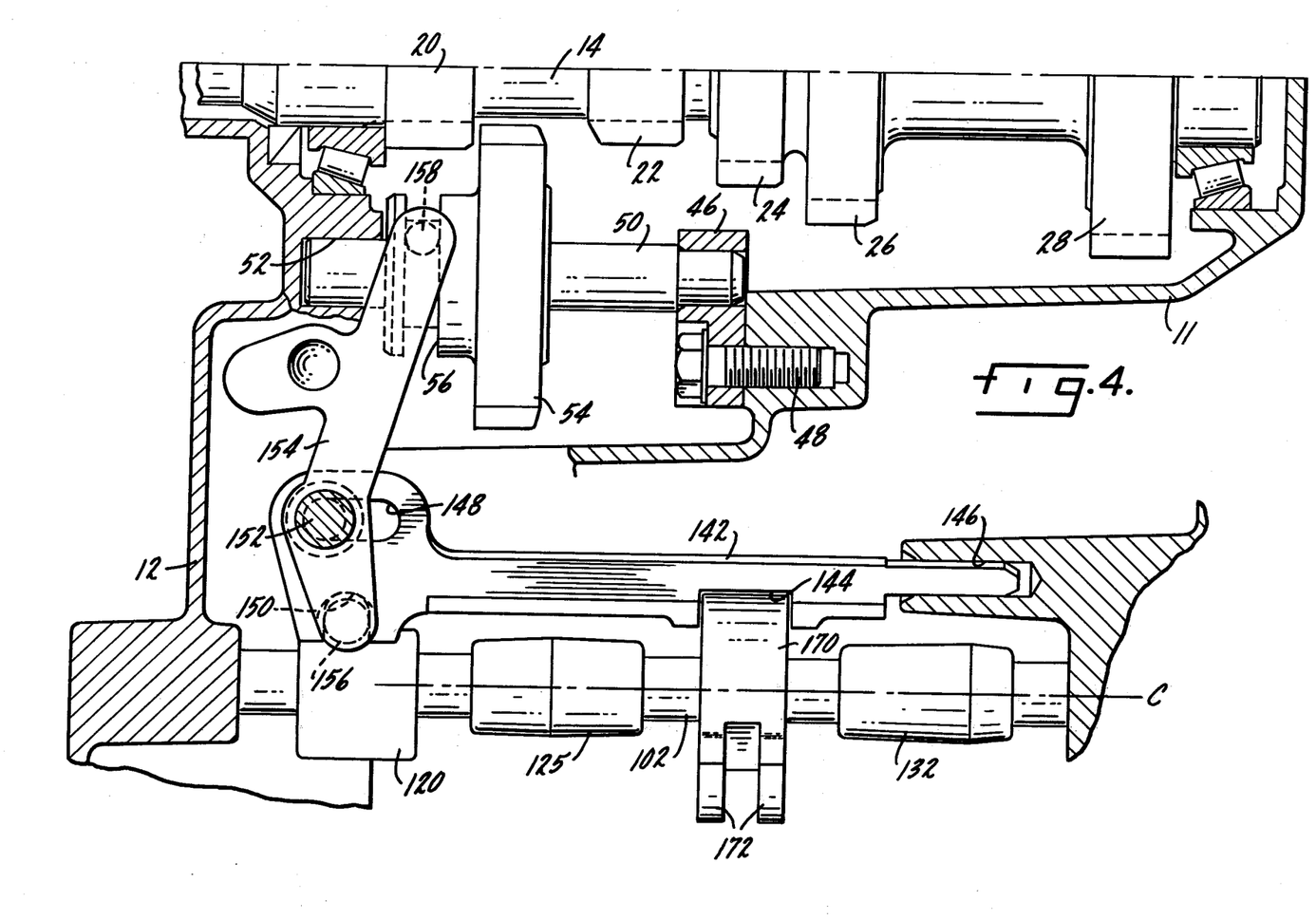
FIG. 4 is a sectional view taken along the line 4—4 of FIG. 1 showing additional details of the shift control mechanism, namely the reverse gear actuating linkage, as well as the input and reverse idler gears.

With reference to FIGS. 4, 5, 6 and 7, the reverse gear actuating linkage includes a reverse transfer bar 142 extending along shift rail 102 and defining an inwardly facing slot 144 in alignment with slots 130 and 138. In a preferred form of the invention, transfer bar 142 is spaced from bar 129 by 20 degrees. As best shown in FIG. 4, transfer bar 142 is slidable in a bore 146 defined by housing 11. Transfer bar 142 also defines a slot 148 and a notch 150. A reverse fulcrum pin 152 is rigidly secured to housing 12 and extends through slot 148. Pin 152 and slot 148 guide longitudinal movement of transfer bar 142 and limit the extent thereof. A reverse idler lever 154 is pivotal about the axis of reverse fulcrum pin 152. Reverse idler lever 154 defines a pad 156 extending into notch 150 of reverse transfer bar 142. Reverse idler lever 154 also defines a pad 158 extending into groove 56 of gear 54. As shown in FIG. 4, transfer bar 142 is at its extreme rightward position and reverse idler gear 54 is disengaged. Leftward movement of transfer bar 142 causes pivotal movement of reverse idler lever 154 clockwise about the axis of reverse fulcrum pin 152. This causes rightward movement of gear 54 into meshing engagement with gears 22 and 42. Movement of reverse idler lever 154 actuates a suitable switch 160 to turn on the backup lights of an associated vehicle.

As best shown in FIG. 7, a selector head 162 is secured to shift rail 102 for rotational and longitudinal movement therewith. Selector head 162 defines a finger 164 extending into slot 130 of bar 129. In this position, shift rail 102 is engaged with shift fork 125. Counterclockwise rotation of shift rail 102 and selector head 162 by 20 degrees moves finger 164 out of slot 130 and into slot 138 of bar 136. In this position, shift rail 102 is engaged with shift fork 132. Similarly, clockwise rotation of shift rail 102 and selector head 162 by 20 degrees moves finger 164 out of slot 130 and into slot 144 of transfer bar 142. In this position, shift rail 102 is engaged with the reverse gear actuating linkage. Thus crossover selection is accomplished by rotation of shift rail 102 such that finger 164 of selector head 162 is positioned within one of slots 130, 138 or 144.

An interlock is provided to insure that only one bar is moved at any given time. A guide 168 may be, for example, the inner end of a bolt secured to housing 11. An interlock member 170 includes bifurcated end portion 172 straddling guide 168. Outwardly extending tongues 174 defined by selector head 162 fit into inwardly facing grooves 176 defined by interlock member 170. It is apparent that as shift rail 102 and selector head 162 rotate, tongues 174 rotate interlock member 170 relative to guide 168. As finger 164 is rotated into one of slots 130, 138 or 144, interlock member 170 is rotated into the other two slots. Upon longitudinal movement of shift rail 102 and selector head 162, finger 164 carries the engaged bar, but tongues 174 slide in grooves 176. Guide 168 prevents longitudinal movement of interlock member 170, and this prevents longitudinal movement of the remaining two bars in either direction.

As shown in FIGS. 5 and 7, longitudinal movement of shift rail 102 causes finger 164 to slide bar 129 and shift fork 125 along shift rail 102. This causes longitudinal sliding movement of synchronizer 40 so as to engage either gear 30 or gear 32 with output shaft 16. Interlock member 170 prevents longitudinal movement of bar 136 and transfer bar 142. With finger 164 positioned in slot 138, longitudinal movement of shift rail 102 causes finger 164 to slide bar 136 and shift fork 132 longitudinally, moving synchronizer 44 so as to engage either gear 34 or gear 36 with output shaft 16. Interlock member 170 prevents longitudinal movement of bar 129 and transfer bar 142. With finger 164 in slot 144, longitudinal movement of shift rail 102 operates the reverse gear actuating linkage. Transfer bar 142 is moved longitudinally, thereby pivoting reverse idler lever 154 about the axis of reverse fulcrum pin 152. Gear 54 is moved along shaft 50 into meshing engagement with gears 22 and 42. Interlock member 170 prevents longitudinal movement of bars 129 and 136.

The shift control mechanism and the gears are arranged to give the shift pattern shown in FIG. 9, as seen by the vehicle operator. In neutral, finger 164 is in notch 130 so as to select shift fork 125. Rightward movement of control shaft 58, as shown in FIG. 2, causes counterclockwise pivotal movement of idler lever 90 and downward movement of shift rail 102. This corresponds to rightward movement of shift rail 102, as shown in FIG. 5. Shift fork 125 moves synchronizer 40 to the right so as to engage gear 30 with output shaft 16, thereby establishing the first forward gear ratio. Similarly, leftward movement of control shaft 58, as shown in FIG. 2, causes clockwise pivotal movement of idler lever 90 and upward movement of shift rail 102. This corresponds to leftward movement of shift rail 102, as shown in FIG. 5. Shift fork 125 moves synchronizer 40 to the left so as to engage gear 32 with output shaft 16, thereby establishing the second forward gear ratio.

Rotation of control shaft 58 clockwise from neutral, as shown in FIG. 3, causes idler lever 90 to slide rightwardly along the axis of fulcrum pin 82. This corresponds to upward movement, as shown in FIG. 1. This movement causes counterclockwise rotation of shift rail 102, thus moving finger 164 out of slot 130 of bar 129 and into slot 138 of bar 136. Pad 140 insures proper alignment of finger 164 in slot 138 by preventing excessive crossover movement. Alternatively, pad 140 could be removed and surfaces 124 and 128 so oriented that abutment of surface 124 against surface 128 limits the longitudinal travel of idler lever 90, and thus limits counterclockwise rotation of shift rail 102 at a point where finger 164 is aligned in slot 138.

Rightward movement of control shaft 58, as shown in FIG. 2, results in rightward movement of shift fork 132, as shown in FIG. 5. Synchronizer 44 engages gear 34 with output shaft 16 so as to establish the third forward gear ratio. Similarly, leftward movement of control shaft 58, as shown in FIG. 2, corresponds to leftward movement of shift fork 132, as shown in FIG. 5. Synchronizer 44 engages gear 36 with output shaft 16, thereby establishing the fourth forward gear ratio.

Rotation of control shaft 58 counterclockwise from neutral, as shown in FIG. 3, slides idler lever 90 to the left until surface 122 abutts surface 126. This rotates shift rail 102 clockwise, as shown in FIG. 7, so as to move finger 164 out of slot 130 and into slot 144 of transfer bar 142. Subsequent movement of control shaft 58 to the right, as shown in FIG. 2, causes leftward movement of transfer bar 142, as shown in FIG. 4, so as to engage the reverse gear ratio.

It should be apparent that a simple and very compact shift control mechanism has been disclosed herein, which mechanism provides for a control shaft oriented at 90 degrees relative to a single shift rail. Rotation of the control shaft causes rotation of the shift rail to effect crossover selection. Thereafter, longitudinal movement of the control shaft causes longitudinal movement of the shift rail to effect engagement of the selected gear ratio. An interlock prevents inadvertent clashing of other gears as the selected gear ratio is being established. Alternative limit stops may be provided to insure proper alignment of the shift control mechanism with the shift forks and the reverse transfer bar during crossover selection.

Although the shift control mechanism as disclosed herein may be used in conjunction with a transmission having four forward speed ratios, it is readily adapted for use in other transmissions, with or without overdrive.

While a preferred embodiment of the invention has been shown and described, this should be considered as illustrative and may be modified by those skilled in the art. It is intended that the claims herein cover all such modifications as may fall within the spirit and scope of the invention.

What is claimed is:

1. A transmission shift control mechanism comprising a control shaft rotatable on and slidable along a first axis, an idler lever slidable along a second axis in response to rotation of said control shaft, said idler lever being pivotal about said second axis in response to sliding of said control shaft, a shift rail rotatable on a third axis in response to sliding of said idler lever, said shift rail being slidable along said third axis in response to pivoting of said idler lever, each axis being substantially normal to the other two axes, and means responsive to rotation and sliding of said shift rail respectively for selecting and engaging at least one transmission ratio.

2. The invention of claim 1, further comprising means for limiting said rotation of said shift rail in at least one direction.

3. The invention of claim 1, said control shaft including a control head, said idler lever including first and second lever arms, said control head and said first lever arm defining a first articulated connection, said shift rail including a shift head, and said second lever arm and said shift head defining a second articulated connection.

4. The invention of claim 3, said first and second connections being located at different distances respectively from said first and third axes.

5. The invention of claim 4, said first connection being farther from said first axis than said second connection is from said third axis.

6. The invention of claim 4, said first and second lever arms being of different lengths.

7. The invention of claim 4, said control and shift heads being of different lengths.

8. The invention of claim 6, said control and shift heads being of different lengths.

9. The invention of claim 5, said control head being longer than said shift head.

10. The invention of claim 9, said first lever arm being longer than said second lever arm.

11. The invention of claim 10, further comprising means for limiting said rotation of said shift rail in at least one direction.

12. The invention of claim 11, said limiting means limiting said rotation of said shift rail in two directions.

13. The invention of claim 11, said limiting means limiting said sliding of said idler lever in at least one direction so as to limit said rotation of said shift rail in at least one direction.

14. The invention of claim 12, said limiting means limiting said sliding of said idler lever in two directions so as to limit said rotation of said shift rail in two directions.

15. A transmission shift control mechanism comprising control means movable in a plurality of directions, idler means connected with said control means for articulated movement in one direction relative thereto upon movement thereof in one direction and for articulated movement in another direction relative thereto upon movement thereof in another direction, shift means connected with said idler means for articulated movement in a first direction relative thereto upon movement thereof in its one direction and for articulated movement in a second direction relative thereto upon movement thereof in its other direction, said movements of said control, idler and shift means being respectively on and along first, second and third axes, each axis being oriented transversely relative to the other two axes.

16. The invention of claim 15, wherein each axis is substantially perpendicular to the other two axes.

17. The invention of claim 15, wherein said movement of said control means in its one direction is rotational and said movement thereof in its other direction is longitudinal.

18. The invention of claim 17, wherein said movement of said idler means in its one direction is longitudinal and said movement thereof in its other direction is rotational.

19. The invention of claim 18, wherein said movement of said shift means in said first direction is rotational and said movement thereof in said second direction is longitudinal.

20. The invention of claim 19, said control means being rotatable in a first plane and slidable on said first axis, said idler means being rotatable in a second plane and slidable on said second axis, and said shift means being rotatable in a third plane and slidable on said third axis.

21. The invention of claim 20, each of said planes being oriented transversely relative to the other two planes.

22. The invention of claim 21, each of said planes being substantially perpendicular to the other two planes.

23. The invention of claim 20, each of said axes being oriented transversely relative to the other two axes.

24. The invention of claim 23, each axis being substantially perpendicular to the other two axes.

25. In a transmission including a plurality of gears for establishing a plurality of gear ratios, and means for selecting and engaging gears to establish said ratios; the improvement wherein said selecting and engaging means comprises a control shaft supported for rotation on and axial movement along a first axis, a control head secure to said control shaft for rotation and axial movement therewith, said control head defining a first socket, an idler lever supported for rotation on and axial movement along a second axis substantially perpendicular to said first axis, said idler lever including a first lever arm having a first ball seated in said first socket and forming therewith a first articulated connection, a shift rail supported for rotation on and axial movement along a third axis substantially perpendicular to said first and second axes, a shift head secured to said shift rail for rotation and axial movement therewith, said shift head defining a second socket, said idler lever including a second lever arm having a second ball seated in said second socket and forming therewith a second articulated connection, a selector head secured to said shift rail for rotation and axial movement therewith, a plurality of movable bars, each bar defining a notch in alignment with said selector head, and means responsive to movement of said bars for engaging gears to establish said ratios, said selector head being selectively rotatable into said notches for selecting one of said bars, and said selector head being selectively axially movable in at least one direction for moving the selected bar, thereby effecting engagement of gears to establish at least one of said ratios.

26. The invention of claim 25, said selecting and engaging means further comprising means for preventing movement of the remainder of said bars upon selection of one of said bars by said selector head.

27. The invention of claim 25, wherein one of said bars is a transfer bar defining a slot, and said gear engaging means includes a fixed fulcrum extending into said slot, said transfer bar being movable relative to said fulcrum, a lever supported for pivotal movement about said fulcrum in response to movement of said transfer bar for effecting engagement of gears to establish one of said ratios, and means for preventing axial movement of said selector head in one axial direction when said transfer bar is selected by said selector head, said preventing means allowing axial movement thereof in the other axial direction.

28. The invention of claim 25, wherein said first connection is farther from said first axis than said second connection is from said third axis.

29. The invention of claim 28, wherein said first lever arm is longer than said second lever arm.

30. The invention of claim 28, wherein said control head is longer than said shift head.

31. The invention of claim 29, wherein said control head is longer than said shift head.

32. In a transmission including housing means, and first and second gears supported for rotation in said housing means; the improvement comprising an inwardly opening bore defined by said housing means, a support block rigidly secured to the interior of said housing means and defining another bore, a shaft rigidly supported in said bores, an idler gear defining a groove, said idler gear being slidable on said shaft between a disengaged position and an engaged position in meshing relationship with said first and second gears, and actuating linkage including a transfer bar defining a slot and a notch, a fulcrum pin rigidly secured to the interior of said housing means and extending into said slot, said transfer bar being slidable relative to said fulcrum pin between first and second positions, and an idler lever pivotal about said fulcrum pin, said idler lever including a pad extending into said notch whereby said idler lever is pivoted about said fulcrum pin upon sliding of said transfer bar relative to said fulcrum pin, said idler lever also including a pad extending into said groove whereby said gear is slid between its disengaged and engaged positions upon pivoting of said idler lever about said fulcrum pin.

* * * * *